(12) United States Patent
Lee et al.

(10) Patent No.: US 12,358,653 B2
(45) Date of Patent: Jul. 15, 2025

(54) ELECTRICAL UMBILICAL SYSTEM FOR SPACE LAUNCH VEHICLE, USING ELECTROMAGNET

(71) Applicant: INNOSPACE CO., LTD., Sejong (KR)

(72) Inventors: Jeong Chan Lee, Daejeon (KR); Keun Hwan Moon, Sejong (KR); Jong Hwi Choi, Incheon (KR); Go Eun Choi, Sejong (KR)

(73) Assignee: INNOSPACE CO., LTD., Sejong-si (KR)

( * ) Notice: Subject to any disclaimer, the term of this patent is extended or adjusted under 35 U.S.C. 154(b) by 0 days.

(21) Appl. No.: 18/829,462

(22) Filed: Sep. 10, 2024

(65) Prior Publication Data

US 2024/0425207 A1    Dec. 26, 2024

Related U.S. Application Data

(63) Continuation of application No. PCT/KR2023/003504, filed on Mar. 16, 2023.

(51) Int. Cl.
*B64G 5/00* (2006.01)
*B64G 1/42* (2006.01)

(52) U.S. Cl.
CPC .................. *B64G 1/428* (2013.01)

(58) Field of Classification Search
CPC .......... B64G 1/428; B64G 1/002; B64G 5/00; B64G 1/66
See application file for complete search history.

(56) References Cited

U.S. PATENT DOCUMENTS

| | | | |
|---|---|---|---|
| 7,575,456 B2 * | 8/2009 | Cronin | H01R 13/635 |
| | | | 439/258 |
| 9,074,842 B2 * | 7/2015 | Merems | F41F 3/055 |
| 10,960,989 B2 | 3/2021 | Carreker | |
| 2015/0153135 A1 | 6/2015 | Merems | |
| 2020/0180455 A1 | 6/2020 | Mailloux | |
| 2021/0101681 A1 * | 4/2021 | Cleary | B64D 1/12 |

FOREIGN PATENT DOCUMENTS

| | | |
|---|---|---|
| CN | 106740212 A | 5/2017 |
| JP | 2014-218229 A | 11/2014 |
| JP | 2019-001193 A | 1/2019 |
| KR | 10-2005-0061185 A | 6/2005 |
| KR | 10-2015-0128693 A | 11/2015 |
| KR | 10-1824009 B1 | 1/2018 |

* cited by examiner

*Primary Examiner* — Alentina Xavier
(74) *Attorney, Agent, or Firm* — United One Law Group LLC; Kongsik Kim; Jhongwoo Peck (57) ABSTRACT

An electrical umbilical system for a space launch vehicle, using an electromagnet includes a connection module which is provided to a launch vehicle unit flyable by means of thrust; and an umbilical unit which is provided to a tower unit supporting the launch vehicle unit so as to stand upright, and which is capable of being electrically connected to the connection module. The umbilical unit includes a supply module which is capable of electrically connected to the connection module; a connection drive module which is coupled to the tower unit and connects the supply module to the connection module; a weight body which is coupled to the tower unit so as to be vertically movable; a drive line which connects the supply module and the weight body; and a guide roller which is rotatably coupled to the tower unit and supports the drive line.

7 Claims, 5 Drawing Sheets

ELECTRICAL UMBILICAL SYSTEM FOR SPACE LAUNCH VEHICLE, USING ELECTROMAGNET

CROSS-REFERENCE TO RELATED APPLICATIONS

This application is a Continuation of International Application No. PCT/KR2023/003504 filed Mar. 16, 2023, which claims priority from Korean Application No. 10-2022-0033493 filed Mar. 17, 2022. The aforementioned applications are incorporated herein by reference in their entireties.

TECHNICAL FIELD

The present disclosure relates to an electrical umbilical system using an electromagnet for a space launch vehicle and, more particularly, to an electrical umbilical system using an electromagnet for a space launch vehicle, the electrical umbilical system applying an electromagnetic method to fix an umbilical unit to a connection module provided in a launch vehicle unit up to a required time point and to separate the umbilical unit from the connection module in response to a launch operation of the launch vehicle unit so that a normal retrieval operation of the umbilical unit or an abnormal retrieval operation of the umbilical unit is stably performed.

RELATED ART

Generally, a rocket is installed on a rocket launcher when preparing for launch, and is then connected to the ground through an umbilical cable to receive power and various control signals from the ground.

The umbilical cable is connected to the rocket so that the umbilical cable is automatically removed from the rocket when the rocket is launched. One end of the umbilical cable is fixed to the ground, and a cable retrieval apparatus is installed on the rocket launcher so that the umbilical cable separated from the rocket is quickly retrieved to the ground. The cable retrieval apparatus is usually powered by a motor or hydraulic device.

However, in order to separate an umbilical cable from a rocket and retrieve the umbilical cable according to a prior art, a cable retrieval apparatus is operated by electric force. Accordingly, when power is not supplied properly during rocket launch, the umbilical cable cannot be quickly retrieved, there is a high risk that the unretrieved umbilical cable may collide with the fuselage or wings of the rocket being launched and damage the rocket, and the cable retrieval apparatus is not only complex in structure due to electrical configuration thereof, but is expensive.

A prior art document includes Korean Patent Application Publication No. 10-2005-0061185 (published on Jun. 22, 2005, invention title: UMBILICAL CABLE RETRIEVAL APPARATUS OF ROCKET).

SUMMARY

The present disclosure has been made to solve the above problems occurring in the prior art, and is intended to propose an electrical umbilical system using an electromagnet for a space launch vehicle, the electrical umbilical system applying an electromagnetic method to fix an umbilical unit to a connection module provided in a launch vehicle unit up to a required time point and to separate the umbilical unit from the connection module in response to a launch operation of the launch vehicle unit so that a normal retrieval operation of the umbilical unit or an abnormal retrieval operation of the umbilical unit is stably performed.

According to an exemplary embodiment for achieving the objectives of the present disclosure described above, an electrical umbilical system using an electromagnet for a space launch vehicle according to the present disclosure includes: a connection module provided in a launch vehicle unit capable of flying by thrust; and an umbilical unit provided in a tower unit by which the launch vehicle unit is supported upright, and being capable of being electrically connected to the connection module, wherein the umbilical unit includes: a supply module capable of being electrically connected to the connection module; a connection drive module coupled to the tower unit and configured to connect the supply module to the connection module; a weight body coupled to the tower unit so that the weight body is capable of moving up and down; a drive line configured to connect the supply module with the weight body; and a guide roller coupled rotatably to the tower unit and configured to support the drive line, wherein whether the connection module and the supply module are coupled to each other is determined depending on whether at least any one of the connection module and the supply module is magnetized by electricity.

Here, the connection module may include: a connection connector comprising a connection terminal that is electrically conductive, a connection coupling member configured to cover the connection terminal so that a portion of the connection terminal is exposed, and a connection insulating means configured to insulate the connection terminal from the connection coupling member; and a connection cable connected to the connection terminal, and the supply module may include: a supply connector comprising a supply terminal that is electrically conductive to be electrically connected to the connection terminal, a supply coupling member configured to cover the supply terminal so that a portion of the supply terminal is exposed, and a supply insulating means configured to insulate the supply terminal from the supply coupling member; and a supply cable connected to the supply terminal, wherein at least one of the connection coupling member and the supply coupling member may be magnetized by electricity applied thereto.

The electrical umbilical system using an electromagnet for a space launch vehicle according to the present disclosure may further include: a static buffering module configured to buffer a load acting on at least one of the weight body, the drive line, and the connection drive module in response to falling of the weight body.

Here, the static buffering module may include at least one of: a weight buffering part configured to elastically support the weight body in the tower unit in response to the falling of the weight body; a bracket buffering part configured to elastically support the supply module in the connection drive module in response to the falling of the weight body; and an abnormal buffering part configured to elastically support the drive line in the tower unit in response to the falling of the weight body.

The electrical umbilical system using an electromagnet for a space launch vehicle according to the present disclosure may further include: a cable cutting module configured to cut the drive line when the connection module and the supply module are maintained to be coupled to each other in response to a launch operation of the launch vehicle unit.

Here, an electrical connection part may be formed to be recessed in the launch vehicle unit, with the electrical connection part allowing the connection module to be mounted therein and the supply module to be inserted therein through an entrance thereof, and the cable cutting module may include a cable cutter disposed upright at a side of the entrance of the electrical connection part.

Here, the cable cutter may be coupled to the launch vehicle unit so that the cable cutter is capable of moving up and down, and the cable cutting module may further include a cutter drive part configured to move the cable cutter up and down.

According to the electrical umbilical system using an electromagnet for a space launch vehicle according to the present disclosure, the electrical umbilical system applies an electromagnetic method to fix the umbilical unit to the connection module provided in the launch vehicle unit up to a required time point and to separate the umbilical unit from the connection module in response to the launch operation of the launch vehicle unit, thereby stably performing a normal retrieval operation of the umbilical unit or an abnormal retrieval operation of the umbilical unit.

In addition, according to the present disclosure, through the detailed coupling relationship of the umbilical unit, it is possible to ensure whether the connection module and the supply module are connected and coupled to each other. In addition, it is possible to ensure a normal retrieval operation according to the separation of the connection module and the supply module from each other and the falling of the weight body. In addition, it is possible to easily deliver the supply module to the launch vehicle unit by the connection drive module. In addition, due to the weight body, it is possible to maintain the tension of the drive line stable, and to ensure the retrieval of the supply module or the drive line in the normal retrieval operation of the supply module or the abnormal retrieval operation of the supply module.

In addition, according to the present disclosure, through the detailed coupling relationship of the connection module and the supply module, it is possible to ensure the electrical connection of the connection terminal and the supply terminal, maintain the coupling force of the connection coupling member and the supply coupling member stable, and easily separate the connection coupling member and the supply coupling member from each other.

In addition, according to the present disclosure, through the coupling relationship of a static buffering module, it is possible to alleviate an impact applied to the tower unit according to the falling of a weight.

In addition, according to the present disclosure, through the weight buffering part, it is possible to absorb an impact caused by the weight body. In addition, through the bracket buffering part, it is possible to absorb an impact caused by the supply module which is retrieved. In addition, through the abnormal buffering part, it is possible to stably grip the drive line which is retrieved.

In addition, according to the present disclosure, through the coupling relationship of the cable cutting module, it is possible to easily cut the drive line for the abnormal retrieval operation of the supply module.

In addition, according to the present disclosure, through the detailed coupling relationship of the cable cutting module, it is possible to ensure the cutting operation of the drive line and to prevent the drive line from colliding with the exterior of the launch vehicle unit in response to the abnormal retrieval operation of the supply module.

In addition, according to the present disclosure, by independently configuring the electrical umbilical system for a space launch vehicle with a minimal configuration utilizing the characteristics of an electromagnet, it is possible to stably implement the fixing operation, separation operation, normal retrieval operation, and abnormal retrieval operation of the supply module, and to prevent problems caused by the abnormal retrieval operation of the supply module.

In addition, compared to an existing electrical umbilical system, the electrical umbilical system of the present disclosure has improved in weight lightening and safety and is able to be applied to various space launch vehicles.

DETAILED DESCRIPTION

Hereinafter, an embodiment of an electrical umbilical system using an electromagnet for a space launch vehicle according to the present disclosure will be described with reference to the accompanying drawings. In this case, the present disclosure is not restricted or limited by the embodiment. In addition, when describing the present disclosure, detailed descriptions of known functions or configurations may be omitted to make the gist of the present disclosure clear.

Referring to FIGS. 1 to 5, the electrical umbilical system using an electromagnet for a space launch vehicle according to an embodiment of the present disclosure includes a connection module 20 provided in a launch vehicle unit 10, and an umbilical unit provided in a tower unit 30.

The launch vehicle unit 10 is capable of flying by thrust. The launch vehicle unit 10 flies by generating thrust as fuel burns with oxidizer in a combustion chamber.

The launch vehicle unit 10 is provided with the connection module 20 for electrical connection with the umbilical unit. An electrical connection part 11 is formed to be recessed in the launch vehicle unit 10, with the electrical connection part 11 allowing the connection module 20 to be mounted therein and a supply module to be inserted therein through an entrance thereof. The connection module 20 is fixed to the electrical connection part 11 provided in the launch vehicle unit 10. The electrical connection part 11 may be formed on a side part of the launch vehicle unit 10 by being recessed therefrom.

The connection module 20 may include a connection connector 21, and a connection cable 25.

The connection connector 21 includes a connection terminal 22 that is electrically conductive, a connection coupling member 24 that covers the connection terminal 22 so that a portion of the connection terminal 22 is exposed, and a connection insulating means that insulates the connection terminal 22 from the connection coupling member 24.

The connection coupling member 24 may be magnetized by electricity applied thereto.

The connection insulating means may include at least a connection insulating member 23 of the connection insulating member 23 that insulates the inside of the connection coupling member 24 and a connection insulating cover that insulates the outside of the connection coupling member 24.

The connection cable 25 is connected to the connection terminal 22. The connection cable 25 may include a connection magnetization cable connected to the connection coupling member 24.

The tower unit 30 supports the launch vehicle unit 10 to be upright. The tower unit 30 is provided with an umbilical unit for electrical connection with the connection module 20. Since the umbilical unit is electrically connected to the connection module 20, the umbilical unit supplies electricity to the launch vehicle unit 10. In this case, whether the connection module 20 and the umbilical unit are coupled to each other is determined depending on whether at least one of the connection module 20 and the umbilical unit is magnetized by electricity.

The umbilical unit may include the supply module capable of being electrically connected to the connection module 20, a connection drive module 120 that is coupled to the tower unit 30 and connects the supply module to the connection module 20, a weight body 130 coupled to the tower unit 30 so that the weight body 130 is capable of moving up and down, a drive line 150 that connects the supply module to the weight body 130, and a guide roller 140 that is rotatably coupled to the tower unit 30 and supports the drive line 150. In this case, whether the connection module 20 and the supply module are coupled to each other is determined depending on whether at least one of the connection module 20 and the supply module is magnetized by electricity.

The supply module may include a supply connector 110, and a supply cable.

The supply connector 110 includes a supply terminal 111 that is electrically conductive to be electrically connected to the connection terminal 22, a supply coupling member 113 that covers the supply terminal 111 so that a portion of the supply terminal 111 is exposed, and a supply insulating means that insulates the supply terminal 111 from the supply coupling member 113.

The supply coupling member 113 may be magnetized by electricity applied thereto.

Finally, at least one of the connection coupling member 24 and the supply coupling member 113 is magnetized by electricity applied thereto.

The supply insulating means may include at least a supply insulating member 112 of the supply insulating member 112 that insulates the inside of the supply coupling member 113, and a supply insulating cover that insulates the outside of the supply coupling member 113.

The supply cable is connected to the supply terminal 111. The supply cable may include a supply magnetization cable connected to the supply coupling member 113.

The connection drive module 120 may include a supply bracket 121 that seats and supports the supply connector 110 of the supply module, and a bracket drive part 122 that reciprocates the supply bracket 121.

The supply bracket 121 may include a bracket body coupled to the bracket drive part 122, and a seating body that protrudes from the bracket body and supports the supply connector 110 so that the supply connector 110 is capable of sliding.

The bracket drive part 122 is capable of transferring the supply bracket 121 from the tower unit 30 to the launch vehicle unit 10 through various known forms.

The drive line 150 is allowed to pass through the supply bracket 121.

The weight body 130 is coupled to the tower unit 30 so that weight body 130 is capable of moving up and down. Accordingly, when the supply bracket 121 is transferred from the tower unit 30 to the launch vehicle unit 10, the weight body 130 is moved up along the tower unit 30, and falls in the tower unit 30 in response to the normal retrieval operation of the supply module or the abnormal retrieval operation of the supply module.

The guide roller 140 is rotatably coupled to the tower unit 30, and when the supply module is fixed to the connection module 20, it is advantageous to ensure that the drive line 150 is horizontal.

The supply cable and the supply magnetization cable are provided in the drive line 150 so that the supply cable and the supply magnetization cable may be protected.

The umbilical unit may further include at least one of a static buffering module 160 and a cable cutting module 170.

The static buffering module 160 buffers a load acting on at least one of the weight body 130, the drive line 150, and the connection drive module 120 in response to the falling of the weight body 130.

The static buffering module 160 may include at least one of a weight buffering part 160a that elastically supports the weight body 130 in the tower unit 30 in response to the falling of the weight body 130, a bracket buffering part 160b that elastically supports the supply module in the connection drive module 120 in response to the falling of the weight body 130, and an abnormal buffering part 160c that elastically supports the drive line 150 in the tower unit 30 in response to the falling of the weight body 130.

The abnormal buffering part 160c may include a buffering stopper 161 coupled slidably to the tower unit 30, a buffering slider 162 coupled integrally to the drive line 150 between the guide roller 140 and the buffering stopper 161, and a buffering elastic member 163 that elastically presses the buffering stopper 161 in a direction in which the buffering stopper 161 and the buffering elastic member 163 approach each other on the basis of the tower unit 30 so that the buffering stopper 161, and the buffering slider 162 and the buffering elastic member 163 approach each other or are spaced apart from each other.

The drive line 150 passes through the buffering stopper 161 so that the drive line 150 is capable of moving up and down.

In this case, in an initial state, the buffering slider 162 is supported by the buffering stopper 161, and as the supply module is coupled to the connection module 20, the buffering slider 162 is spaced apart from the buffering stopper 161 and raised. In addition, while the drive line 150 moves down in response to the falling of the weight body 130, the buffering slider 162 falls and is supported back by the buffering stopper 161, and the buffering elastic member 163 may absorb an impact.

The cable cutting module 170 cuts the drive line 150 when the connection module 20 and the supply module are maintained to be coupled to each other in response to the launch operation of the launch vehicle.

The cable cutting module 170 may include a cable cutter 171 disposed upright at the side of the entrance of the electrical connection part 11.

When the cable cutter 171 is coupled to the launch vehicle unit 10 so that the cable cutter 171 is capable of moving up and down, the cable cutting module 170 may further include a cutter drive part 172 that moves the cable cutter 171 up and down.

Fixing Operation of the Supply Module

Figure 1:
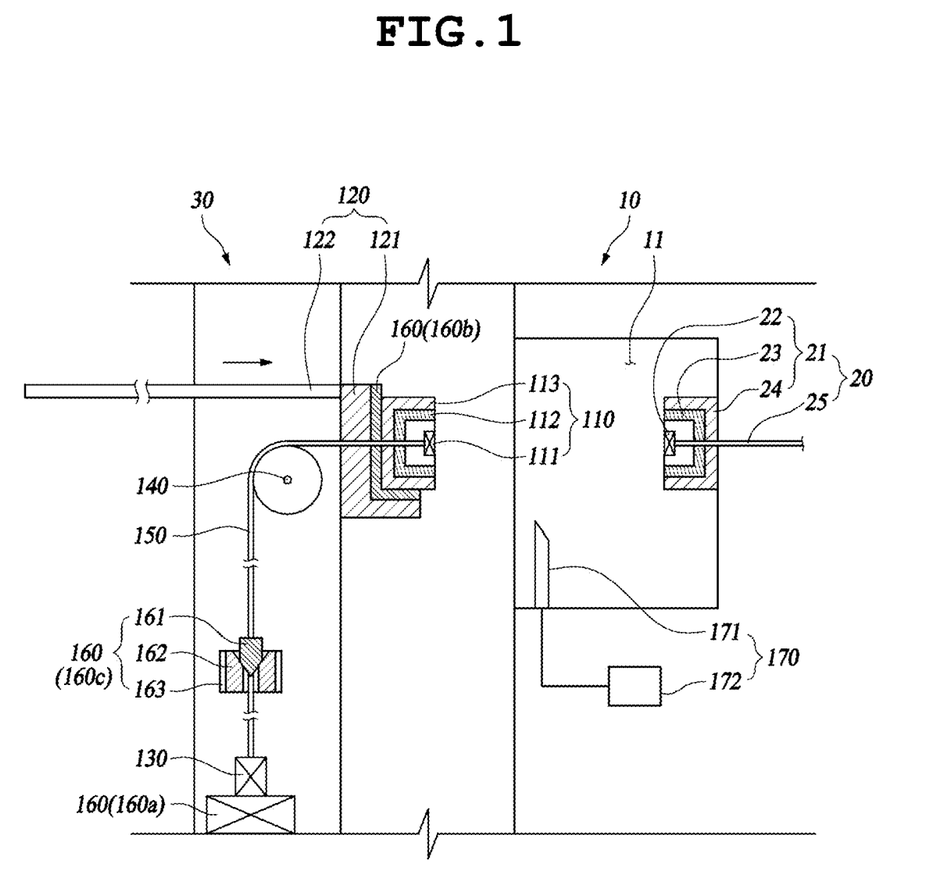
FIG. 1 is a view illustrating the initial arrangement state of a connection module and a supply module in an electrical umbilical system using an electromagnet for a space launch vehicle according to an embodiment of the present disclosure.

As illustrated in FIG. 1, the supply connector 110 is seated on and supported by the supply bracket 121 of the connection drive module 120 so that the supply connector 110 faces the connection module 20. As the bracket drive part 122 operates, the supply connector 110 moves to the electrical connection part 11, and the supply terminal 111 of the supply module is connected to the connection terminal 22 of the connection module 20. The bracket drive part 122 generates a driving force to move the weight body 130 up and down.

Figure 2:
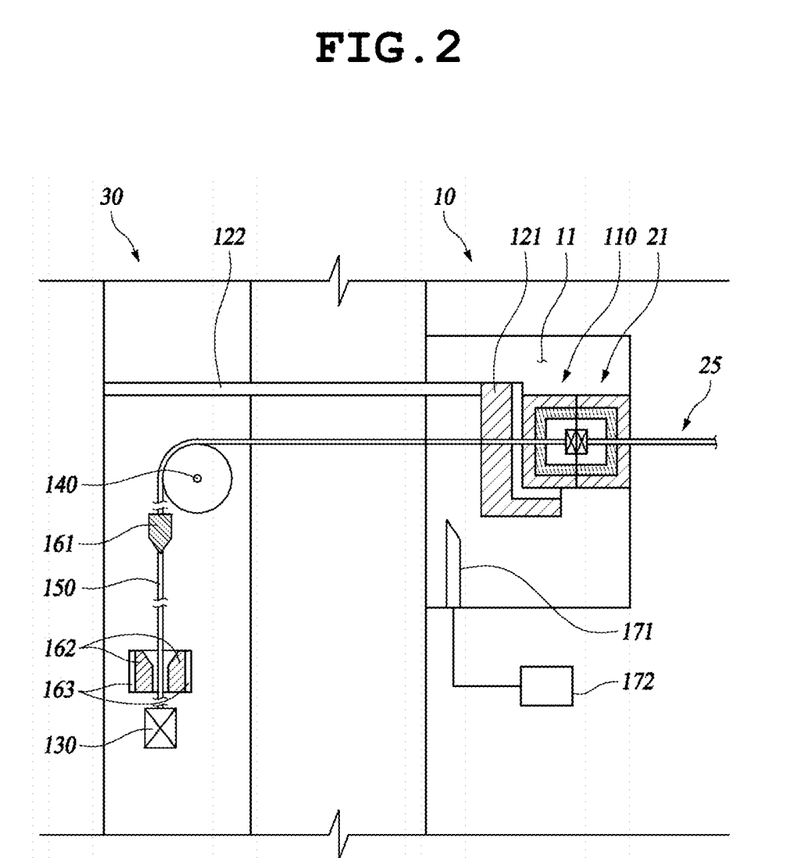
FIG. 2 is a view illustrating a state in which the connection module and the supply module are connected to each other in the electrical umbilical system using an electromagnet for a space launch vehicle according to an embodiment of the present disclosure.

In this case, as at least one of the connection coupling member 24 and the supply coupling member 113 is magnetized by electricity applied thereto, the supply module may be fixed to the connection module 20 as illustrated in FIG. 2.

In addition, as electricity is applied to the supply cable, electricity may be supplied to the connection cable 25. In addition, as the bracket drive part 122 operates, the supply bracket 121 returns to an original position thereof.

Separating Operation of the Supply Module

Electricity supply to the launch vehicle unit 10 is completed, and the launch operation of the launch vehicle unit 10 is implemented.

Figure 3:
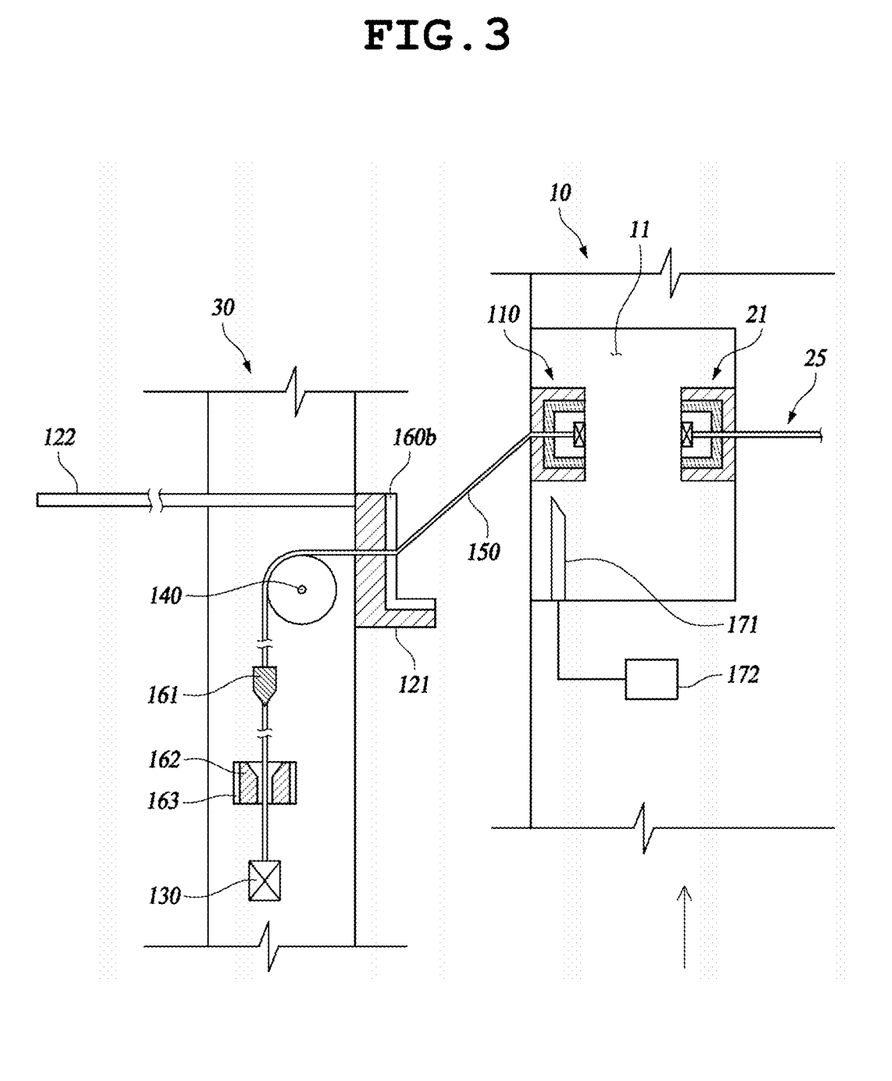
FIG. 3 is a view illustrating a state in which the supply module is separated from the launch vehicle unit in response to the launch operation of a launch vehicle unit in the electrical umbilical system using an electromagnet for a space launch vehicle according to an embodiment of the present disclosure.

As an example, as the electricity supplied to the connection coupling member 24 and the supply coupling member 113 is cut off, the connection coupling member 24 and the supply coupling member 113 are demagnetized, and the supply connector 110 may be separated from the connection connector 21 as illustrated in FIG. 3.

For another example, a repulsive force acts on the connection coupling member 24 and the supply coupling member 113 by electricity supplied to the connection coupling member 24 and the supply coupling member 113, and the supply connector 110 may be separated from the connection connector 21 as illustrated in FIG. 3.

Normal Retrieval Operation of the Supply Module

Figure 4:
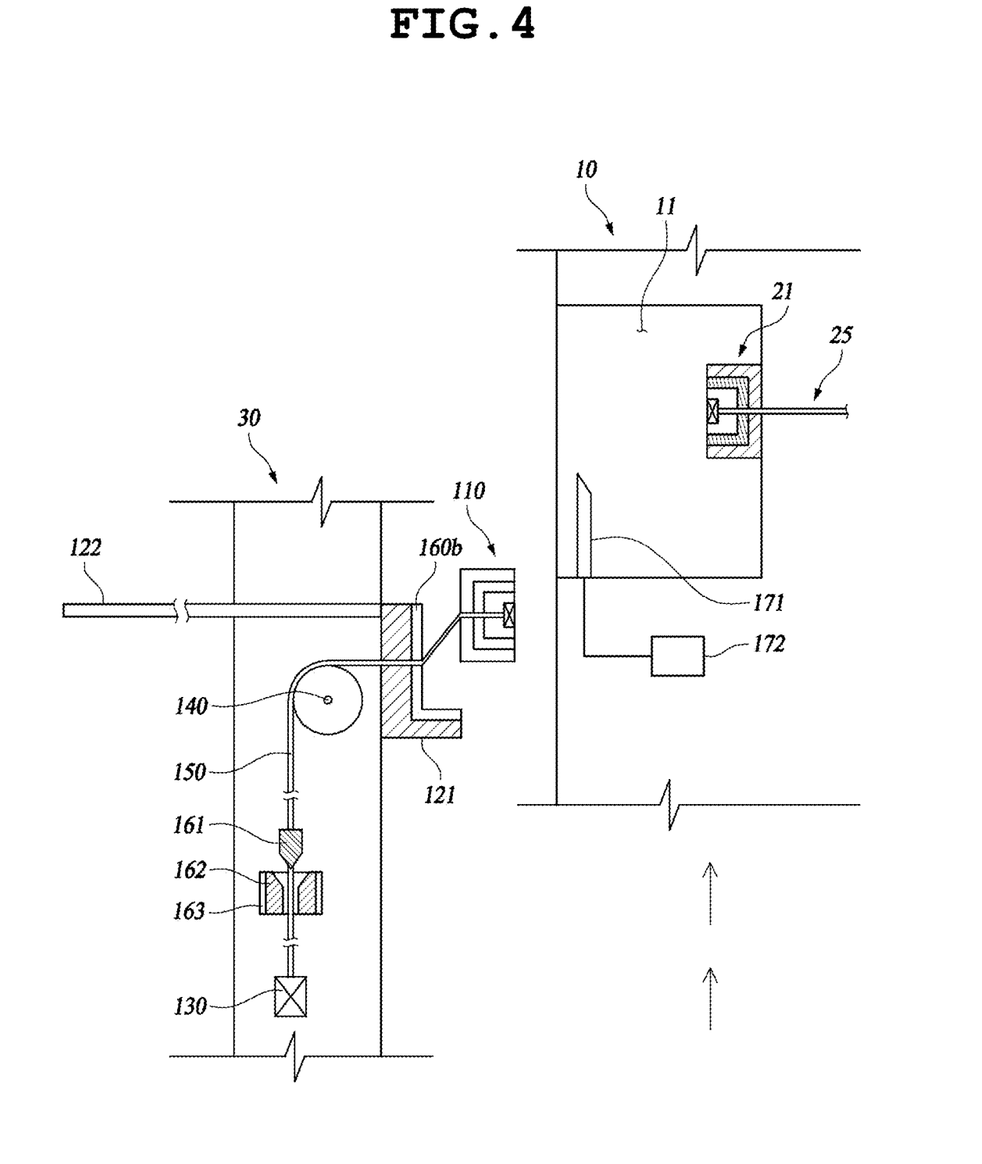
FIG. 4 is a view illustrating a normal retrieval operation state of the supply module in response to the launch operation of the launch vehicle unit in the electrical umbilical system using an electromagnet for a space launch vehicle according to an embodiment of the present disclosure.

When the launch operation of the launch vehicle unit 10 is implemented, the weight body 130 falls by a weight thereof as the separating operation of the supply module is implemented, and the supply connector 110 is separated from the electrical connection part 11 and transferred to the supply bracket 121 as illustrated in FIG. 4.

In addition, the supply connector 110 is supported by the bracket buffering part 160b provided on the supply bracket 121, the buffering slider 162 is supported by the buffering stopper 161, and the weight body 130 is supported by the weight buffering part 160a, so the normal retrieval operation of the supply module may be completed.

Abnormal Retrieval Operation of the Supply Module

Figure 5:
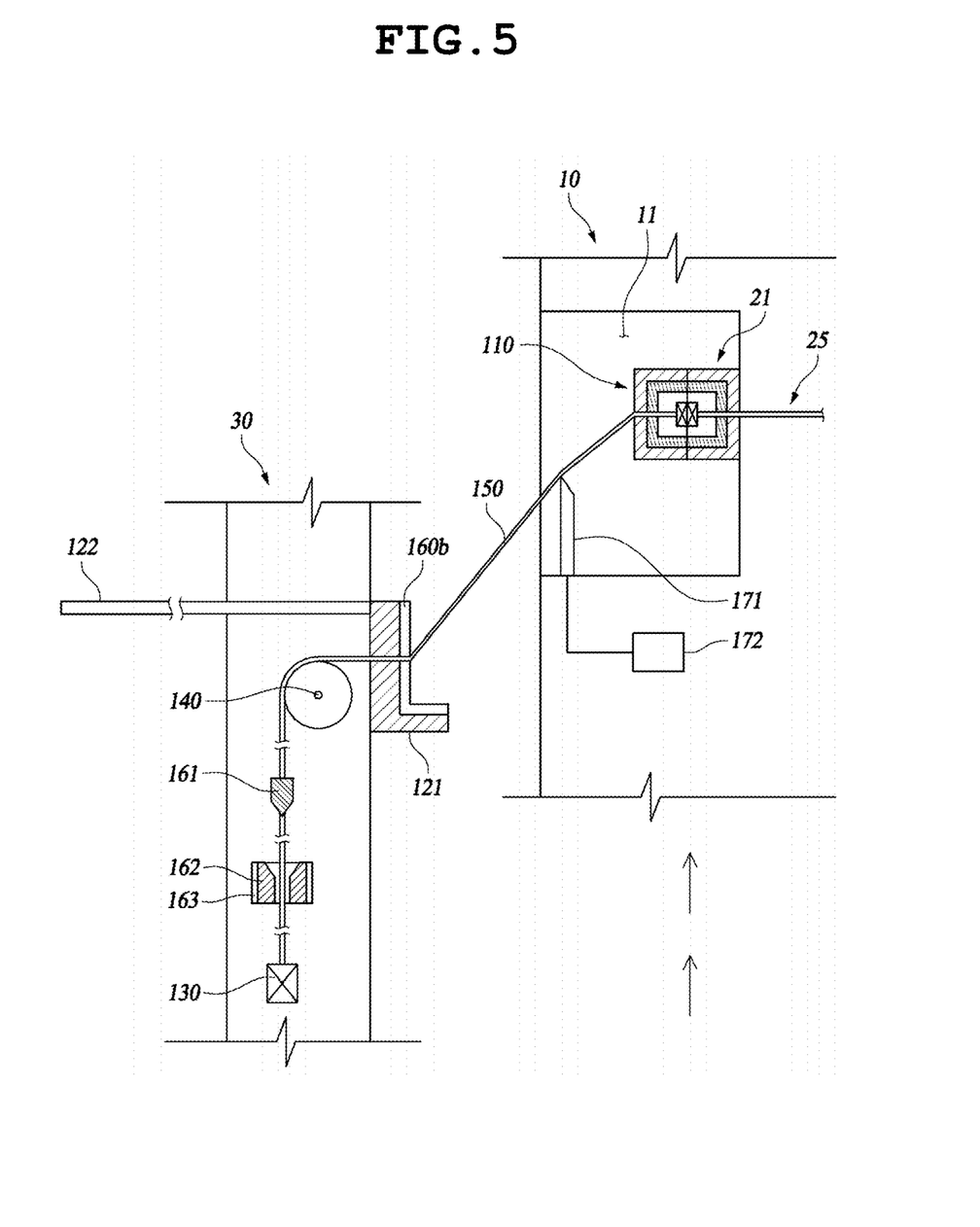
FIG. 5 is a view illustrating an abnormal retrieval operation state of the supply module in response to the launch operation of the launch vehicle unit in the electrical umbilical system using an electromagnet for a space launch vehicle according to an embodiment of the present disclosure.

When the launch operation of the launch vehicle unit 10 is implemented, the supply coupling member 113 may be maintained to be fixed on the connection coupling member 24 due to malfunction. In addition, as illustrated in FIG. 5, according to the launch operation of the launch vehicle unit 10, the drive line 150 contacts the cable cutter 171 of the cable cutting module 170. As the launch vehicle unit 10 continues to rise according to the launch operation of the launch vehicle unit 10, the drive line 150 presses the cable cutter 171, so the drive line 150 is cut by the cable cutter 171.

As the drive line 150 is cut, the weight body 130 falls due to weight thereof.

In addition, the supply connector 110 is supported by the bracket buffering part 160b provided on the supply bracket 121, the buffering slider 162 is supported by the buffering stopper 161, and the weight body 130 is supported by the weight buffering part 160a, so it is possible to complete the abnormal retrieval operation of the supply module.

According to the electrical umbilical system using an electromagnet for a space launch vehicle described above, the electrical umbilical system applies an electromagnetic method to fix the supply module to the connection module 20 provided in the launch vehicle unit 10 up to a required time point and to separate the supply module from the connection module 20 in response to the launch operation of the launch vehicle unit 10, thereby stably performing the normal retrieval operation of the supply module or the abnormal retrieval operation of the supply module.

In addition, through the detailed coupling relationship of the umbilical unit, it is possible to ensure whether the connection module 20 and the supply module are connected and coupled to each other. In addition, it is possible to ensure a normal retrieval operation according to the separation of the connection module 20 and the supply module from each other and the falling of the weight body 130. In addition, it is possible to easily deliver the supply module to the launch vehicle unit 10 by the connection drive module 120. In addition, due to the weight body 130, it is possible to maintain the tension of the drive line 150 stable, and to ensure the retrieval of the supply module or the drive line 150 in the normal retrieval operation of the supply module or the abnormal retrieval operation of the supply module.

In addition, through the detailed coupling relationship of the connection module 20 and the supply module, it is possible to ensure the electrical connection of the connection terminal 22 and the supply terminal 111, maintain the coupling force of the connection coupling member 24 and the supply coupling member 113 stable, and easily separate the connection coupling member 24 and the supply coupling member 113 from each other.

In addition, through the coupling relationship of a static buffering module 160, it is possible to alleviate an impact applied to the tower unit according to the falling of a weight.

In addition, through the weight buffering part 160a, it is possible to absorb an impact caused by the weight body 130 which falls. In addition, through the bracket buffering part 160b, it is possible to absorb an impact caused by the supply module which is retrieved. In addition, through the abnormal buffering part 160c, it is possible to stably grip the drive line 150 which is retrieved.

In addition, through the coupling relationship of the cable cutting module 170, it is possible to easily cut the drive line 150 for the abnormal retrieval operation of the supply module.

In addition, through the detailed coupling relationship of the cable cutting module 170, it is possible to ensure the cutting operation of the drive line 150 and to prevent the drive line 150 from colliding with the exterior of the launch vehicle unit 10 in response to the abnormal retrieval operation of the supply module.

In addition, by independently configuring the electrical umbilical system for a space launch vehicle with a minimal configuration utilizing the characteristics of an electromagnet, it is possible to stably implement the fixing, separation, normal retrieval operation, and abnormal retrieval operation of the supply module, and to prevent problems caused by the abnormal retrieval operation of the supply module.

In addition, compared to an existing electrical umbilical system, the electrical umbilical system of the present disclosure has improved in weight lightening and safety and is able to be applied to various space launch vehicles.

As described above, the exemplary embodiments of the present disclosure have been described with reference to the drawings, but those skilled in the art will understand that the embodiments may be variously modified or changed within the scope of the spirit and scope of the present disclosure as set forth in the claims below.

REFERENCE NUMERALS

10: Launch vehicle unit
11: Electrical connection part
20: Connection module
21: Connection connector
22: Connection terminal
23: Connection insulating member
24: Connection coupling member
25: Connection cable
30: Tower unit
110: Supply connector
111: Supply terminal
112: Supply insulating member
113: Supply coupling member
120: Connection drive module
121: Supply bracket
122: Bracket drive part
130: Weight body
140: Guide roller
150: Drive line
160: Static buffering module
160a: Weight buffering part
160b: Bracket buffering part
160c: Abnormal buffering part
161: Buffering stopper
162: Buffering slider
163: Buffering elastic member
170: Cable cutting module
171: Cable cutter
172: Cutter drive part

What is claimed is:

1. An electrical umbilical system using an electromagnet for a space launch vehicle, the system comprising:
   a connection module provided in a launch vehicle unit capable of flying by thrust; and
   an umbilical unit provided in a tower unit by which the launch vehicle unit is supported upright, and being capable of being electrically connected to the connection module,
   wherein the umbilical unit comprises:
      a supply module capable of being electrically connected to the connection module;
      a connection drive module coupled to the tower unit and configured to connect the supply module to the connection module;
      a weight body coupled to the tower unit so that the weight body is capable of moving up and down;
      a drive line configured to connect the supply module with the weight body; and
      a guide roller coupled rotatably to the tower unit and configured to support the drive line, and
   wherein whether the connection module and the supply module are coupled to each other is determined depending on whether at least any one of the connection module or the supply module is magnetized by electricity.

2. The system of claim 1, wherein the connection module comprises:
   a connection connector comprising a connection terminal that is electrically conductive, a connection coupling member configured to cover the connection terminal so that a portion of the connection terminal is exposed, and a connection insulating means configured to insulate the connection terminal from the connection coupling member; and
   a connection cable connected to the connection terminal, wherein the supply module comprises:
      a supply connector comprising a supply terminal that is electrically conductive to be electrically connected to the connection terminal, a supply coupling member configured to cover the supply terminal so that a portion of the supply terminal is exposed, and a supply insulating means configured to insulate the supply terminal from the supply coupling member; and
      a supply cable connected to the supply terminal, and
   wherein at least one of the connection coupling member or the supply coupling member is magnetized by electricity applied thereto.

3. The system of claim 1, further comprising:
   a static buffering module configured to buffer a load acting on at least one of the weight body, the drive line, or the connection drive module in response to falling of the weight body.

4. The system of claim 3, wherein the static buffering module comprises at least one of:
   a weight buffering part configured to elastically support the weight body in the tower unit in response to the falling of the weight body;
   a bracket buffering part configured to elastically support the supply module in the connection drive module in response to the falling of the weight body; or
   an abnormal buffering part configured to elastically support the drive line in the tower unit in response to the falling of the weight body.

5. The system of claim 1, further comprising:
   a cable cutting module configured to cut the drive line when the connection module and the supply module are maintained to be coupled to each other in response to a launch operation of the launch vehicle unit.

6. The system of claim 5, wherein an electrical connection part is formed to be recessed in the launch vehicle unit, with the electrical connection part allowing the connection module to be mounted therein and the supply module to be inserted therein through an entrance thereof, and
   wherein the cable cutting module comprises a cable cutter disposed upright at a side of the entrance of the electrical connection part.

7. The system of claim 6, wherein the cable cutter is coupled to the launch vehicle unit so that the cable cutter is capable of moving up and down, and
   wherein the cable cutting module further comprises a cutter drive part configured to move the cable cutter up and down.

* * * * *